(12) United States Patent
Ban et al.

(10) Patent No.: US 6,263,687 B1
(45) Date of Patent: Jul. 24, 2001

(54) AIR CONDITIONING SYSTEMS

(75) Inventors: Takashi Ban; Toshiro Fujii; Takanori Okabe, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/481,037

(22) Filed: Jan. 11, 2000

(30) Foreign Application Priority Data

Jan. 12, 1999 (JP) ................................................. 11-005831

(51) Int. Cl.[7] ................................ F25B 1/00; B60H 1/03
(52) U.S. Cl. ......................... 62/228.3; 62/228.5; 62/159; 417/222.2
(58) Field of Search .............................. 62/228.3, 228.5, 62/228.1, 215, 160, 159, 196.3, 196.1, 196.4; 417/222.2, 270, 278

(56) References Cited

U.S. PATENT DOCUMENTS

| 5,027,612 | * | 7/1991 | Terauchi ........................... | 62/228.5 X |
| 5,823,000 | * | 10/1998 | Takai ............................... | 62/228.3 X |
| 6,038,871 | * | 3/2000 | Gutierrez et al. ................ | 62/228.3 X |
| 6,126,405 | * | 10/2000 | Kawaguchi et al. .............. | 417/222.2 |

FOREIGN PATENT DOCUMENTS 5-223357  8/1993  (JP) .

7-19630   1/1995  (JP) .

* cited by examiner

*Primary Examiner*—Harry B. Tanner
(74) *Attorney, Agent, or Firm*—Morgan & Finnegan, L.L.P.

(57) ABSTRACT

An air conditioning system 100 may include a compressor 101 having a driving chamber 110, a cooling circuit 151, a heating circuit 152 and capacity controllers 301, 401. The compressor 101 may have a suction port 115, a discharge port 120, a driving unit 130 provided within the driving chamber 110. The driving unit 130 decreases compressor output discharge capacity when pressure within the driving chamber 110 increases. The first capacity controller 301 and the second capacity controller 401 are provided in series onto the capacity control passage 321, 323, 421. The first capacity controller 301 opens the capacity control passage 321, 323 when compressor suction pressure Ps results predetermined low-pressure state during operation of the cooling circuit 151 and the second capacity controller 401 opens the capacity control passage 323, 421 during operation of the cooling circuit. As the result, the heat exchanger 159 in the cooling circuit 151 is prevented from being frosted. The first capacity controller 301 opens the capacity control passage 321, 323 during operation of the heating circuit 152 and the second capacity controller 401 opens the capacity control passage 323, 421 when compressor discharge pressure Pd results predetermined high-pressure state during operation of the heating circuit 152. As the result, the heating circuit 152 is prevented from being damaged by an abnormally high discharge pressure.

18 Claims, 5 Drawing Sheets

AIR CONDITIONING SYSTEMS

BACKGROUND OF THE INVENTION

1. Technical Field

The present invention relates to air conditioning systems that utilize refrigerants and a compressor, and particularly to air conditioning systems capable of alleviating excessive increases in refrigerant discharge pressure within a heating circuit.

2. Description of the Related Art

A known air conditioning system is disclosed in Japanese Unexamined Patent Publication No. 7-19630 and includes a compressor 1, a cooling circuit 51, a heating circuit 52 and a controller 83, as shown in FIG. 1. The cooling circuit 51 includes a condenser 55, a first expansion valve 57 and a heat exchanger 59 provided on a passage connecting a discharge port D to a suction port S of the compressor 1. High temperature and high pressure refrigerant discharged from the discharge port D of the compressor 1 is drawn through the above respective devices and back to the compressor 1.

The heating circuit 52 includes a bypass passage 52a that extends from the discharge port D of the compressor 1 to the heat exchanger 59, a second expansion valve 63 provided within the bypass passage 52a and the heat exchanger 59. The high-temperature and high-pressure refrigerant discharged from the compressor 1 is not directed to the condenser 55, but rather is drawn by the compressor 1 through the second expansion valve 63 and the heat exchanger 59. Such a heating circuit 52 is generally known as a hot gas bypass heater.

The operation of the cooling circuit 51 and the heating circuit 52 is changeably selected by opening and closing selector valves 53a and 53b, which opening and closing operations are performed by the controller 83.

Because the refrigerant discharge pressure is higher when the heating circuit 52 is used than when the cooling circuit 51 is used, the air conditioning system must operate in a high pressure state when the heating circuit 52 is utilized. An abnormally high-pressure state may be created if the output discharge capacity of the compressor 1 temporarily increases during the operation of the heating circuit 52. A refrigerant releasing passage 91 having a pressure relief valve 93 is provided in order to release excess pressure from heating circuit 52, if an abnormally high pressure state is reached. The refrigerant releasing passage 91 is connected to the heating circuit 52 and the cooling circuit 51 and the pressure relief valve 93 can be opened to release the refrigerant from the heating circuit 52 into the cooling circuit 51 when the refrigerant discharge pressure abnormally increases during the operation of the heating circuit 52. Because the cooling circuit 51 and the heating circuit 52 are alternatively selected by the selector valves 53a and 53b, the refrigerant is released toward the cooling circuit 51 which is not used when the discharge pressure is increased abnormally during operation of the heating circuit 52, thereby preventing the discharge pressure at the heating circuit 52 from increasing abnormally.

Because the refrigerant is released from the operating heating circuit 52 to the cooling circuit 51 which is not used, the abnormally high-pressure state of the discharge pressure during operation of the heating circuit 52 can be alleviated. However, because the refrigerant in the heating circuit 52 is released into the cooling circuit 51 whenever the discharge pressure increases, the amount of the refrigerant in the heating circuit 52 is reduced and heating performance may be reduced. Moreover, because the high-pressure refrigerant is wastefully released from the heating circuit 52 by working the compressor 1, energy efficiency is reduced.

SUMMARY OF THE INVENTION

It is, therefore, an object of the present invention to provide an air conditioning system that can alleviate abnormally high discharge pressure without releasing the high-pressure refrigerant outside the heating circuit and without reducing the energy efficiency.

Preferably, an air conditioning system may include a compressor having a driving unit within the compressor driving chamber, a cooling circuit, a heating circuit and first and second capacity controllers. The air conditioning system may release high-pressure refrigerant from the compressor discharge port into the compressor driving chamber through a capacity control passage by utilizing the capacity controllers. By increasing the pressure within the driving chamber, the driving unit may decrease the compressor output discharge capacity. As the result, the compressor discharge pressure will be decreased and the compressor suction pressure will be increased by the reduction in the compressor output discharge capacity.

The first and the second capacity controllers are provided in series onto the capacity control passage that connects the discharge port with the driving chamber. The first capacity controller may open the capacity control passage when compressor suction pressure results predetermined low-pressure state during operation of the cooling circuit. And the second capacity controller may open the capacity control passage during operation of the cooling circuit. This is, when the compressor suction pressure results the predetermined low-pressure state during operation of the cooling circuit, high-pressure refrigerant is released from the discharge port into the driving chamber through the first and the second capacity controller. Thus, the pressure within the driving chamber increases and the driving unit decreases the compressor output discharge capacity, thereby increasing the suction pressure and preventing the heat exchanger in the cooling circuit from being frosted. The first capacity controller may open the capacity control passage during operation of the heating circuit. And the second capacity controller may open the capacity control passage when compressor discharge pressure results predetermined high-pressure state during operation of the heating circuit. This is, when the compressor discharge pressure results an abnormally high-pressure state during operation of the heating circuit, high-pressure refrigerant is released from the discharge port into the driving chamber through the first and the second capacity controller. As the result, the pressure within the driving chamber increases and the driving unit decreases the compressor output discharge capacity, thereby alleviating the discharge pressure and preventing the heating circuit from being damaged by the abnormally high discharge pressure.

Other objects, features and advantages of the present invention will be readily understood after reading the following detailed description together with the accompanying drawings and the claims.

DETAILED DESCRIPTION OF THE INVENTION

Figure 1:
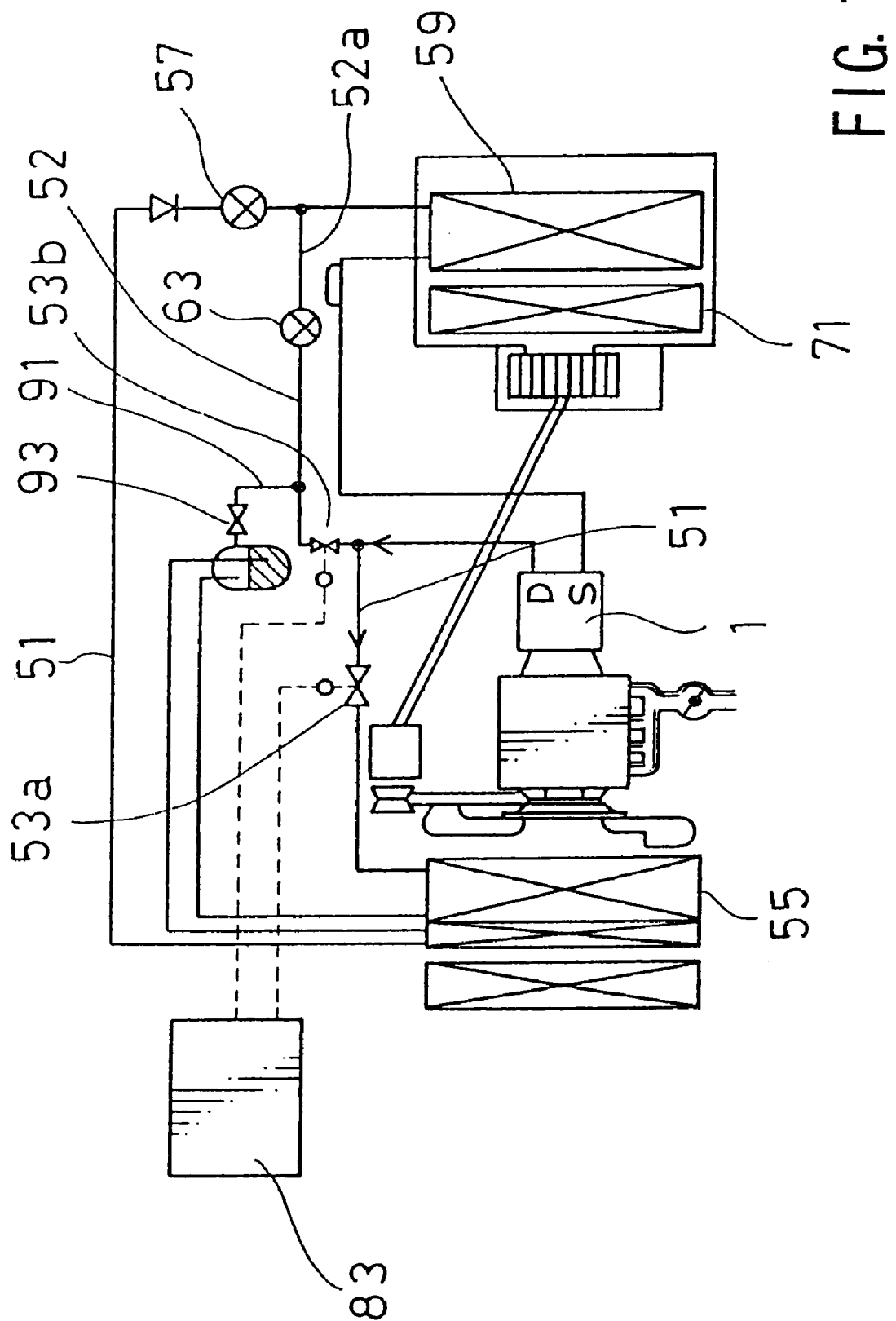
FIG. 1 shows a known air conditioning system.

Preferably, an air conditioning system may include a compressor, a cooling circuit, a heating circuit and first and second controllers. The compressor may have a driving unit provided within a compressor driving chamber, a suction port for drawing refrigerant into the compressor and a discharge port for discharging high-pressure and high-temperature refrigerant from the compressor. The driving unit may decrease the compressor output discharge capacity when the pressure within the driving chamber increases. The cooling circuit may have a condenser and a heat exchanger provided on a passage that extends from the discharge port to the suction port. The heating circuit may have a passage that extends from the discharge port to the heat exchanger. This is, the heating circuit partially overlaps with the cooling circuit. Such type of the heating circuit is generally known as a hot gas bypass heater. Preferably, a decompressor such as an expansion valve may be disposed onto the passage that extends from the discharge port to the heat exchanger in the hot gas bypass heater. The first and the second capacity controllers may be provided in series onto the capacity control passage that may connect the discharge port with the driving chamber. The discharge port can be communicated with the driving chamber through the capacity control passage when both the first and the second capacity controllers open the capacity control passage, because the first and the second capacity controllers are provided in series onto the capacity control passage.

The first capacity controller may open the capacity control passage when compressor suction pressure results predetermined low-pressure state during operation of the cooling circuit. The second capacity controller may open the capacity control passage during operation of the cooling circuit. Therefore, during operation of the cooling circuit, the discharge port is communicated with the driving chamber through the capacity control passage only when the suction pressure results predetermined low-pressure state. By communicating the discharge port with the driving chamber, high-pressure refrigerant is released from the discharge port into the driving chamber, the pressure within the driving chamber increases and the driving unit decreases the compressor output discharge capacity, thereby increasing the suction pressure and preventing the heat exchanger in the cooling circuit from being frosted.

The first capacity controller may open the capacity control passage during operation of the heating circuit. The second capacity controller may open the capacity control passage when compressor discharge pressure results predetermined high-pressure state during operation of the heating circuit. Therefore, during operation of the heating circuit, the discharge port is communicated with the driving chamber through the capacity control passage only when the discharge pressure results predetermined high-pressure state. By communicating the discharge port with the driving chamber, high-pressure refrigerant is released from the discharge port into the driving chamber, the pressure within the driving chamber increases and the driving unit decreases the compressor output discharge capacity, thereby decreasing the discharge pressure and preventing the heating circuit from being damaged by the abnormally high discharge pressure.

The first capacity controller may be provided onto the capacity control passage downstream of the discharge port and the second capacity controller may be provided onto the capacity control passage downstream of the first capacity controller. Otherwise, the second capacity controller may be provided onto the capacity control passage downstream of the discharge port and the first capacity controller may be provided onto the capacity control passage downstream of the second capacity controller.

The first capacity controller may have a first capacity control valve disposed onto the capacity control passage. The first capacity control valve may open the capacity control passage when compressor suction pressure results predetermined low-pressure state during operation of the cooling circuit for preventing the heat exchanger from being frosted. The first capacity control valve may also open the capacity control passage during operation of the heating circuit in order not to hinder the controlling of the discharge pressure by the second capacity controller. The first capacity control valve is one of the features that corresponds to the first capacity controller or to first means for controlling the compressor output discharge capacity.

The second capacity controller may have a second capacity control valve disposed onto the capacity control passage in series with the first capacity control valve. The second capacity control valve may open the capacity control passage when compressor discharge pressure results predetermined high-pressure state during operation of the heating circuit for alleviating the abnormally high discharge pressure and preventing the heating circuit from being damaged by such abnormally high discharge pressure. The second capacity control valve may also open the capacity control passage during operation of the cooling circuit in order not to hinder the controlling of the suction pressure by the first capacity controller. The second capacity control valve is one of the features that corresponds to the second capacity controller or to second means for controlling the compressor output discharge capacity.

Each of the additional features and method steps disclosed above and below may be utilized separately or in conjunction with other features and method steps to provide improved air conditioning systems and methods for designing and using such air conditioning systems. Representative examples of the present invention, which examples utilize many of these additional features and method steps in conjunction, will now be described in detail with reference to the drawings. This detailed description is merely intended to teach a person of skill in the art further details for practicing preferred aspects of the present teachings and is not intended to limit the scope of he invention. Only the claims define the scope of the claimed invention. Therefore, combinations of features and steps disclosed in the following detail description may not be necessary to practice the invention in the broadest sense, and are instead taught merely to particularly describe some representative examples of the invention, which detailed description will now be given with reference to the accompanying drawings.

First Detailed Representative Embodiment

Figure 2:
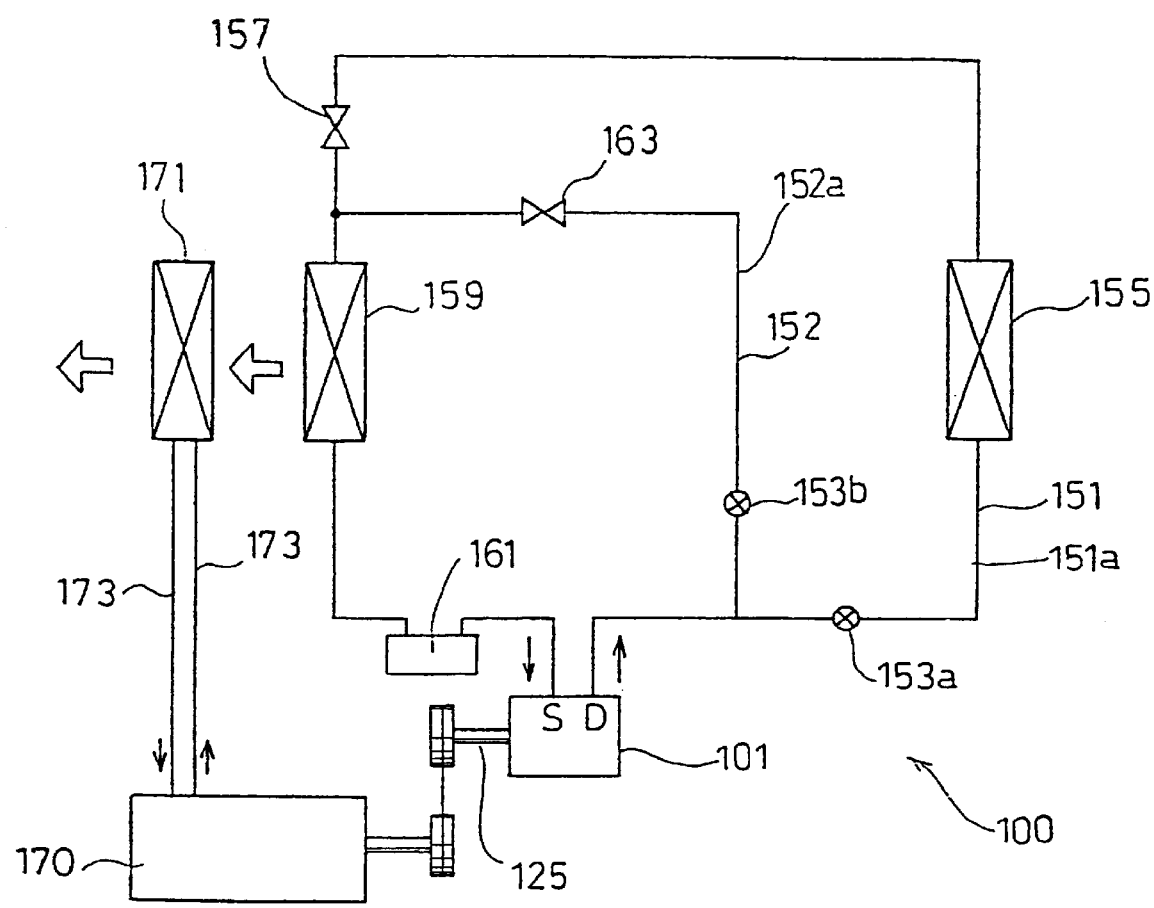
FIG. 2 shows an air conditioning system according to a first representative embodiment.
Figure 3:
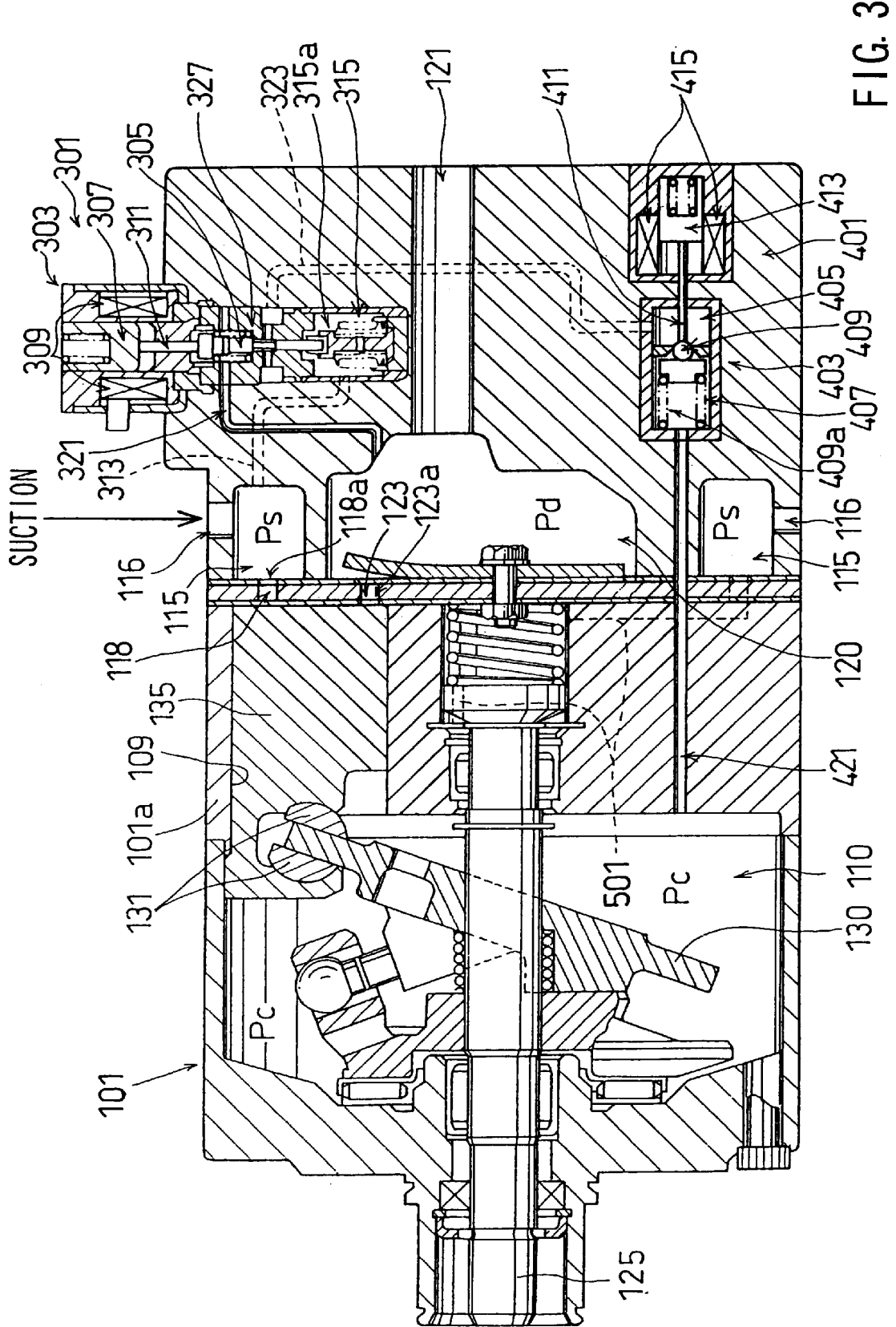
FIG. 3 shows the detailed constructions of a compressor and first and second capacity controllers in an air conditioning system according to the first representative embodiment.

Referring to FIG. 2, the air conditioning system 100 may include a cooling circuit 151, a heating circuit 152 and a variable displacement compressor 101 as a driving source for both the heating and cooling circuits 151, 152. Representative first and second capacity controllers are shown in FIGS. 3, but are not shown in FIG. 2 for the sake of convenience and will be described below in further detail. Such an air conditioning system 100 may be utilized in a vehicle-mounted air conditioning system. In such case, the compressor driving shaft 125 may be coupled to and driven by an automobile engine 170.

The cooling circuit 151 may be driven by high-pressure refrigerant, which is compressed by the compressor 101, and may include a condenser 155, a first expansion valve 157, a heat exchanger 159 and an accumulator 161. These devices may be disposed within a path 151a that extends from a discharge port D to a suction port S of the compressor 101. The heat exchanger 159 is also generally known as an evaporator. The heat exchanger 159 may be arranged side by side with a hot-water heater 171, which circulates hot coolant from the engine 170 through a pipe 173.

The heating circuit 152 may be driven by high-temperature and high-pressure refrigerant, which is also compressed by the compressor 101, and may include a second expansion valve 163, the heat exchanger 159 and the accumulator 161. These devices are disposed on a bypass passage 152a for introducing the refrigerant discharged from the discharge port D to the heat exchanger 159. In other words, the heating circuit 152 partially overlaps with the cooling circuit 151. Such a heating circuit 152 is also generally known as a hot-gas bypass heater.

In FIG. 2, a first open/close valve 153a and a second open/close valve 153b may be utilized as switch valves for alternatively actuating the cooling circuit 151 and the heating circuit 152.

During operation of the cooling circuit 151, the refrigerant is compressed by the compressor 101 to attain a high-temperature and high-pressure state. This compressed refrigerant is sent to the condenser 155, where heat from the high-temperature refrigerant is dissipated to the outside environment and the refrigerant is liquefied. The refrigerant is decompressed by the first expansion valve 157 and sent to the heat exchanger 159 where the refrigerant absorbs outside heat and is gasified. The gasified refrigerant is returned to the compressor 101 again through the accumulator 161 for re-circulation throughout the system 100.

During operation of the heating circuit 152, the refrigerant is compressed by the compressor 101 to attain a high-temperature and high-pressure state. The compressed refrigerant is then decompressed by the second expansion valve 163 and sent to the heat exchanger 159, where heat from the compressed refrigerant is dissipated to the outside environment. In the heating circuit cycle, the refrigerant is constantly in a gaseous state while circulating through the heating circuit 152.

The heating circuit 152 may be used as an auxiliary heater. Heat generated by the heat exchanger 159 during operation of the heating circuit 152 may be used as an auxiliary heating source for the hot water heater 171. The heating circuit 152 also may be used to assist the coolant from the engine 170 when the coolant can not provide sufficient heat to start the engine 170 in a low-temperature environment, such as an outside air temperature of −20° C. or so.

Referring to FIG. 3, a representative compressor 101 is shown that may include a driving chamber 110 defined within a housing 101a of the compressor 101 and a swash plate 130 that is rotatably supported by the driving shaft 125 in the driving chamber 110. The swash plate 130 may be supported by the driving shaft 125 and may rotate together with the driving shaft 125. The swash plate 130 is inclined with respect to the driving shaft 125 when the driving shaft 125 rotates and the inclination angle of the swash plate 130 with respect to a plane perpendicular to the axis of rotation of the driving shaft 125 is changeable.

The peripheral edge portion of the swash plate 130 may be connected to the base portions of the pistons 135 by means of movable shoes 131. Six pistons 135 in total may be disposed around the driving shaft 125 (however, only one piston is shown in FIG. 3 for the sake of convenience) and may be laterally slide within six cylinder bores 109. The circumferential positions of the six cylinder bores 109 are fixed by the compressor housing 101a.

When the swash plate 130 rotates together with the driving shaft 125 while being inclined as shown in FIG. 3, the peripheral edge of the swash plate 130 slides with respect to the piston 135 fixed in the circumferential direction. When the peripheral edge of the swash plate 130 being inclined to a position closest to the cylinder bores 109 (as shown in FIG. 3), the piston 135 reaches its deepest insertion into the cylinder bores 109. When the peripheral edge of the swash plate 130 (the peripheral edge shown in a lower part of FIG. 3) being inclined to a position furthest away from the cylinder bores 109, the piston 135 is substantially withdrawn from the cylinder bore 109. Each 360° rotation of the driving shaft 125 results in each piston 135 laterally reciprocating one time.

A suction port 118a and a discharge port 123a are defined in a bottom portion of each the cylinder bore 109. A suction valve 118 is positioned to correspond to the suction port 118a and a discharge valve 123 is positioned to correspond to the discharge port 123a. Each suction port 118a communicates with a suction chamber 115 and each the discharge port 123a communicates with a discharge chamber 120.

When the piston 135 moves to the left in FIG. 3, as a result of rotation of the swash plate 130, refrigerant is introduced from the suction opening 116 through the suction chamber 115, suction port 118a and suction valve 118 into the cylinder bore 109. When the piston 135 moves to the right in FIG. 3, as a result of further rotation of the swash plate 130, the refrigerant is compressed into a high-pressure state and discharged from a discharge opening 121 through the discharge port 123a, discharge valve 123 and discharge chamber 120.

The output discharge capacity of the compressor 101 is determined by the stroke length of the piston 135, which is determined by the degree of change in inclination angle of the swash plate 130 during each cycle. That is, the further the swash plate 130 is withdrawn from the cylinder bore 109 during each cycle, the longer the stroke length of the piston 135 will be. As the stroke length increases, the output discharge capacity of the compressor 101 also increases.

The inclination angle of the swash plate 130 is determined, in part, by the difference in pressure on the opposite sides of the piston 135, i.e., the pressure difference between driving chamber pressure and the cylinder bore pressure. Increasing or decreasing the driving chamber pressure can adjust this pressure difference.

The driving chamber 110 is connected to the suction chamber 115 through the bleeding passage 501. Although it is not particularly shown in FIG. 3, a throttle is provided in the bleeding passage 501.

In order to decrease the compressor output discharge capacity, the high-pressure refrigerant is released from the discharge chamber 120 into the driving chamber 110. Due to resulting increase in the pressure within the driving chamber 110, the swash plate 130 stands and the stroke length of the piston 135 decreases. Therefore, the output discharge capacity will also decrease. On the other hand, in order to increase the output discharge capacity, the refrigerant in the discharge chamber 120 is prevented from being released into the driving chamber 110. As the result, the pressure within the driving chamber 110 will gradually decrease, the swash plate 130 will move further in the lateral direction and the stroke length of the piston 135 will increase. In this case, the output discharge capacity will increase.

Further, the compressor 101 includes a cooling circuit capacity controller 301 that has a cooling circuit capacity control valve 303 and a heating circuit capacity controller 401 that has a heating circuit capacity control valve 403. The discharge chamber 120 is connected to the cooling circuit capacity control valve 303 through a first capacity control passage 321. The cooling circuit capacity control valve 303 is connected to the heating circuit capacity control valve 403 through a second capacity control passage 323. The heating circuit capacity control valve 403 is connected to the driving chamber 110 through a third capacity control passage 421.

The cooling circuit capacity control valve 303 includes a valve body 305 and a bellows 315 that is provided within a suction pressure detecting chamber 315a. The compressor suction pressure Ps is introduced from the suction chamber 115 to the suction pressure detecting chamber 315a through a suction pressure detecting passage 313. The bellows 315 may expand or contract based on the suction pressure Ps for moving the valve body 305 to open or to close the cooling circuit capacity control valve 303. The valve body 305 is connected with an actuating member 307 by means of a connecting member 311. The actuating member 307 is biased by exciting or not exciting a solenoid 309 such that the reference pressure for opening the cooling circuit capacity control valve 303 may be changed by controlling the biasing force exerted by the solenoid 309 onto the actuating member 307. This is, the biasing force exerted by the solenoid 309 onto the valve body 305 defines the reference pressure for opening the cooling circuit capacity control valve 303. The solenoid 309 is excited by a control signal of a controller (not particularly shown in FIG. 3).

The heating circuit capacity control valve 403 includes a first chamber 405 that is communicated with the cooling circuit capacity control valve 303 through the second capacity control passage 323 and a second chamber 407 that is communicated with the driving chamber 110 through the third capacity control passage 421. Therefore, the pressure within the first chamber 405 is equal to the compressor discharge pressure Pd when the cooling circuit capacity control valve 303 is opened. And the pressure within the second chamber 407 is equal to the pressure Pc within the driving chamber 110. The first and second chambers 405, 407 can be communicated with each other by moving a valve body 409 to open the heating circuit capacity control valve 403. When the pressure within the first chamber 405 (equal to the discharge pressure Pd) increases with respect to the pressure within the second chamber 407 (equal to the pressure Pc within the driving chamber 110), a difference between the pressure Pd within the first chamber 405 and the pressure Pc within the second chamber 407 increases. Such pressure difference will prevail over the biasing force of a spring 409a that is exerted onto the valve body 409 to close the heating circuit capacity control valve 403. Thus, the valve body 409 moves against the biasing force of the spring 409a to communicate the first chamber 405 with the second chamber 407. The first and second chambers 405, 407 are not communicated in a normal operation of the compressor, because the valve body 409 cuts the communication between the first and second chambers 405, 407. Further, the valve body 409 is integrally connected with an actuating member 413 by means of a connecting member 411. The actuating member 413 is biased by exciting a solenoid 415 such that the reference pressure for opening the heating circuit capacity control valve 403 may be changed by controlling the biasing force exerted by the solenoid 415 onto the actuating member 413. The solenoid 415 is excited by a control signal of a controller (not particularly shown in FIG. 3). When the solenoid 415 is excited, the biasing force to open the heating circuit capacity control valve 403 is exerted onto the valve body 409. Therefore, the biasing force exerted onto the valve body 409 by the spring 409a to close the heating circuit capacity control valve 403 and the biasing force exerted onto the valve body 409 by the solenoid 415 to open the heating circuit capacity control valve 403 define the reference pressure for opening the heating circuit capacity control valve 403.

During the operation of the cooling circuit 151, the compressor output discharge capacity is to be controlled exclusively by utilizing the cooling circuit capacity control valve 303 and therefore, the heating circuit capacity control valve 403 is opened during the operation of the cooling circuit 151. The reference pressure for opening the heating circuit capacity control valve 403 is set lower than the discharge pressure Pd during the operation of the cooling circuit 151. As described above, the reference pressure for opening the heating circuit capacity control valve 403 may be changed by utilizing the solenoid 415. In such state, the discharge pressure Pd during the operation of the cooling circuit 151 will meet the condition for opening the heating circuit capacity control valve 403. As the result, the heating circuit capacity control valve 403 is opened during the operation of the cooling circuit 151 and the second capacity control passage 323 is communicated with the third capacity control passage 421 during the operation of the cooling circuit 151.

The cooling circuit capacity control valve 303 is closed when the suction pressure Ps does not result predetermined low-pressure state during the operation of the cooling circuit 151. By closing the cooling circuit capacity control valve 303, the first and second capacity control passages 321, 323 are not communicated with each other. Therefore, the high-pressure refrigerant is not released from the discharge chamber 120 into the driving chamber 110. The pressure Pc within the driving chamber 110 is not increased, the compressor output discharge capacity is not decreased and the discharge pressure Pd is not decreased, thereby maintaining the cooling circuit operating performance at high.

To the contrary, when the suction pressure Ps results predetermined low-pressure state during the operation of the cooling circuit 151, the cooling circuit capacity control valve 303 is opened based on the suction pressure Ps introduced into the suction pressure detecting chamber 315a. By opening the cooling circuit capacity control valve 303, the first and the second capacity control passages 321, 323 are communicated with each other. Therefore, the high-pressure refrigerant within the discharge chamber 120 is released into the driving chamber 110 through the cooling circuit capacity control valve 303 and the heating circuit capacity control valve 403 that is opened during the operation of the cooling circuit 151. By releasing the high-pressure refrigerant into the driving chamber 110, the pressure Pc within the driving chamber 110 is increased, the compressor output discharge capacity is decreased and the suction pressure Ps is increased, thereby preventing the heat exchanger 159 in the cooling circuit 151 from being frosted.

During the operation of the heating circuit 152, the compressor output discharge capacity is to be controlled exclusively by utilizing the heating circuit capacity control valve 403 and therefore, the cooling circuit capacity control valve 303 is opened during the operation of the heating circuit 152. The reference pressure for opening the cooling circuit capacity control valve 303 is set higher than the suction pressure during the operation of the heating circuit 152. As described above, the reference pressure for opening the cooling circuit capacity control valve 303 may be changed by utilizing the solenoid 309. In such state, the suction pressure Ps during the operation of the heating circuit 152 meets the condition for opening the cooling circuit capacity control valve 303. As the result, the cooling circuit capacity control valve 303 is opened during the operation of the heating circuit 152.

During the operation of the heating circuit 152, the heating circuit capacity control valve 403 is closed when the compressor discharge pressure Pd does not result predetermined high-pressure state. Because the difference between the discharge pressure Pd within the first chamber 405 and the pressure Pc within the second chamber 407 does not increase to move the valve body 409. Thus, the heating circuit capacity control valve 403 is not opened. And the second and the third capacity control passages 323, 421 are not communicated with each other. Therefore, the high-pressure refrigerant within the discharge chamber 120 is not released into the driving chamber 110. As the result, the pressure Pc within the driving chamber 110 is not increased, the compressor output discharge capacity is not decreased and the discharge pressure Pd is not decreased, thereby maintaining the heating circuit operation performance at high.

To the contrary, during the operation of the heating circuit 152, the heating circuit capacity control valve 403 is opened when the compressor discharge pressure Pd results predetermined high-pressure state. Because the difference between the discharge pressure Pd within the first chamber 405 and the pressure Pc within the second chamber 407 increases enough to prevail over the biasing force of the spring 409a and to move the valve body 409 to open the heating circuit capacity control valve 403. Thus, the second and the third capacity control passages 323, 421 are communicated with each other. As the result, high-pressure refrigerant within the discharge chamber 120 is released into the driving chamber 110. The pressure Pc within the driving chamber 110 is increased, the compressor output discharge capacity is decreased and the discharge pressure Pd is decreased, thereby alleviating the abnormally high discharge pressure.

In this representative embodiment, energy efficiency is slightly decreased because the compressor 101 releases the compressed refrigerant from the discharge chamber 120 into the driving chamber 110 by utilizing the capacity controllers 301, 401. However, the output discharge capacity of the compressor 101 is decreased by releasing a small amount of the refrigerant. Therefore, the reduction of energy efficiency for controlling the compressor output discharge capacity can be minimized.

Second Detailed Representative Embodiment

Figure 4:
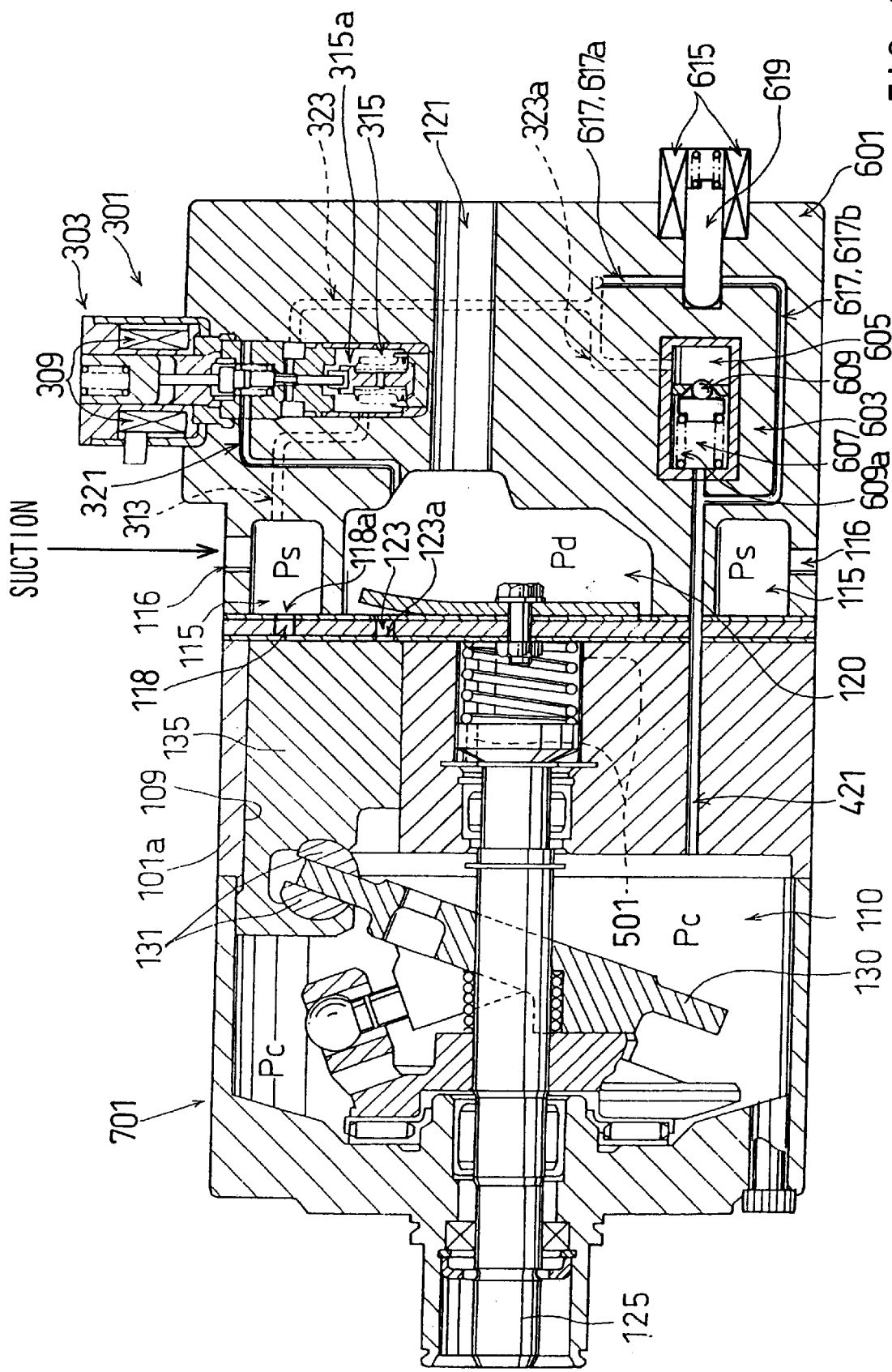
FIG. 4 shows the detailed constructions of a compressor and first and second capacity controllers in an air conditioning system according to a second representative embodiment.

According to a second representative embodiment, a heating circuit capacity controller 601 includes a heating circuit capacity control valve 603 and a pilot valve 619 as shown in FIG. 4. The heating circuit capacity control valve 603 includes a first chamber 605 and a second chamber 607. The first and the second chambers 605, 607 are communicated or not communicated with each other by means of a valve body 609. The valve body 609 is biased by a spring 609a to close the heating circuit capacity control valve 603. The first chamber 605 is connected with the cooling circuit capacity control valve 303 through a second capacity control passage 323 (323a in part). Therefore, the pressure within the first chamber 605 is equal to the discharge pressure Pd when the cooling circuit capacity control valve 303 is opened. The second chamber 607 is connected with the driving chamber 110 through a third capacity control passage 421. Therefore, the pressure within the second chamber 607 is equal to the pressure Pc within the driving chamber 110. The heating circuit capacity control valve 603 is opened or closed based on a difference between the pressure within the first chamber 605 and the pressure within the second chamber 607. When the pressure Pd within the first chamber 605 increases with respect to the pressure Pc within the second chamber 607, the valve body 609 is moved by such difference to open the heating circuit capacity control valve 603. To the contrary, when the pressure Pd within the first chamber 605 does not much increase with respect to the pressure Pc within the second chamber 607, the valve body 609 can not move because the pressure difference does not prevail over the biasing force of the spring 609a. In such case, the heating circuit capacity control valve 603 is closed.

The pilot valve 619 connects an upstream side of the heating circuit capacity control valve 603 with a downstream side of the heating circuit capacity control valve 603 through a bypass passage 617. In other words, the second capacity control passage 323 is bypassed to the third capacity control passage 421 by the first and second bypass passages 617a, 617b. The pilot valve 619 communicates the first bypass passage 617a with the second bypass passage 617b when the pilot valve 619 is opened. The pilot valve 619 is opened or closed by utilizing a solenoid 615. The solenoid 615 is excited or not excited by a controller that is not particularly shown in the drawings.

Structures of another devices utilized in the second representative embodiment are substantially the same with the structures of the respective devices utilized in the first representative embodiment. Therefore, detailed description thereof is omitted for the sake of convenience with respect to such structures.

During the operation of the cooling circuit, the output discharge capacity of the compressor 701 is to be controlled exclusively by opening or closing the cooling circuit capacity control valve 301. Therefore, the heating circuit capacity control valve 603 is to be opened during the operation of the cooling circuit. However, the heating circuit capacity control valve 603 is constructed to open based on a difference between the discharge pressure Pd within the first chamber 605 and the pressure Pc within the second chamber 607. This is, the pressure difference necessary for opening the heating circuit capacity control valve 603 depends on the biasing force of the spring 609a and thus, the reference pressure for opening the heating circuit capacity control valve 603 can not be changed. Therefore, the pilot valve 619 opens the bypass passage 617 in order not to hinder the control of the compressor output capacity control by the cooling circuit capacity control valve 303. By opening the bypass passage 617, the second capacity control passage 323 and the third capacity control passage 421 are communicated with each other during the operation of the cooling circuit. Otherwise, the pilot valve 619 may be opened at least when the suction pressure Ps results predetermined low-pressure state during the operation of the cooling circuit, because the high-pressure refrigerant is necessarily to be released into the driving chamber 110 by the cooling circuit capacity control valve 303 only when the suction pressure Ps results predetermined low-pressure state during the operation of the cooling circuit.

During the operation of the heating circuit, the output discharge capacity of the compressor 701 is to be controlled exclusively by opening or closing the heating circuit capacity control valve 603. Therefore, the cooling circuit capacity control valve 303 is to be opened during the operation of the heating circuit. The cooling circuit capacity control valve 603 may be opened by utilizing the same way as described in the first representative embodiment. Further, the pilot valve 619 is to be closed by utilizing the solenoid 615 all the time during the operation of the heating circuit, because the refrigerant is to be introduced from the cooling circuit capacity control valve 303 to the heating circuit capacity control valve 603 for the alleviation of the discharge pressure.

When the compressor discharge pressure results predetermined high-pressure state during the operation of the heating circuit, a difference between the pressure Pd within the first chamber 605 and the pressure Pc within the second chamber 607 increases and such pressure difference moves the valve body 609 against the biasing force of the spring 609a to open the heating circuit capacity control valve 603. By opening the heating circuit capacity control valve 603, the high-pressure refrigerant is released from the discharge chamber 120 into the driving chamber 110 through the cooling circuit capacity control valve 303 and through the heating circuit capacity control valve 603, thereby alleviating the abnormally high discharge pressure.

In each embodiment, the heating circuit capacity controller and the cooling circuit capacity controller are provided in series onto the capacity control passage between the discharge chamber and the driving chamber such that the refrigerant may be released through the capacity control passage only when the first and the second capacity controllers open the capacity control passage. A capacity control valve that is opened based on a pressure difference or a capacity control valve that is opened based on an outside signal may preferably employed to the heating circuit capacity controller and to the cooling circuit capacity controller. When a valve that is opened based on a pressure difference is employed, such valve may be opened based on a difference between the discharge pressure and another pressure lower than the discharge pressure such like a suction pressure, pressure within the driving chamber, atmospheric pressure or vacuum pressure. Otherwise, such valve may be opened based on a difference between the suction pressure and the pressure other than the suction pressure such like the pressure within the driving chamber, atmospheric pressure or vacuum pressure. When a valve that is opened based on an outside signal is employed, such valve may be opened based on an outside signal that is generated in response to an absolute value of the pressure such like the discharge pressure or the suction pressure. In this connection, several types of compressor output discharge capacity control techniques may be constructed.

Figure 5:
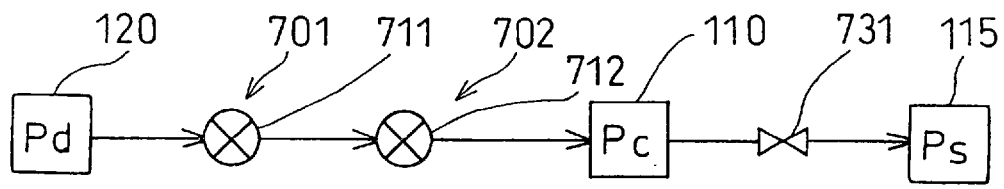
FIGS. 5 to 8 show the schematic constructions of the another representative embodiments.

FIG. 5 shows one of such types in which the capacity control valves that are opened based on the outside signals are employed both to the cooling circuit capacity controller 701 and to the heating circuit capacity controller 702. Such capacity control valves 711, 712 are disposed in series onto the capacity control passage extending from the discharge chamber 120 to the driving chamber 110. The driving chamber 110 is connected to the suction chamber 115. A throttle 731 is disposed between the driving chamber 110 and the suction chamber 115.

When the suction pressure Ps results abnormally low-pressure state during operation of the cooling circuit, high-pressure refrigerant within the discharge chamber 120 is released into the driving chamber 110 through the cooling circuit capacity control valve 711 that is opened only when the suction pressure results predetermined low-pressure state during the operation of the cooling circuit and through the heating circuit capacity control valve 712 that is opened during the operation of the cooling circuit, thereby preventing the heat exchanger in the cooling circuit from being frosted.

When the discharge pressure Pd results abnormally high-pressure state during operation of the heating circuit, high-pressure refrigerant within the discharge chamber 120 is released into the driving chamber 110 through the cooling circuit capacity control valve 711 that is opened during the operation of the heating circuit and through the heating circuit capacity control valve 712 that is opened only when the discharge pressure results predetermined high-pressure state during the operation of the heating circuit, thereby alleviating the abnormally high discharge pressure in operating the heating circuit.

In operating the heating circuit and the cooling circuit, the refrigerant released into the driving chamber 110 is retained within the driving chamber 110 relatively for long time, because the throttle 731 prevents the refrigerant from being released swiftly from the driving chamber 110 into the suction chamber 115. Therefore, high-pressure state within the driving chamber 110 can be maintained relatively for long time, thereby decreasing the compressor output discharge capacity effectively.

Figure 6:
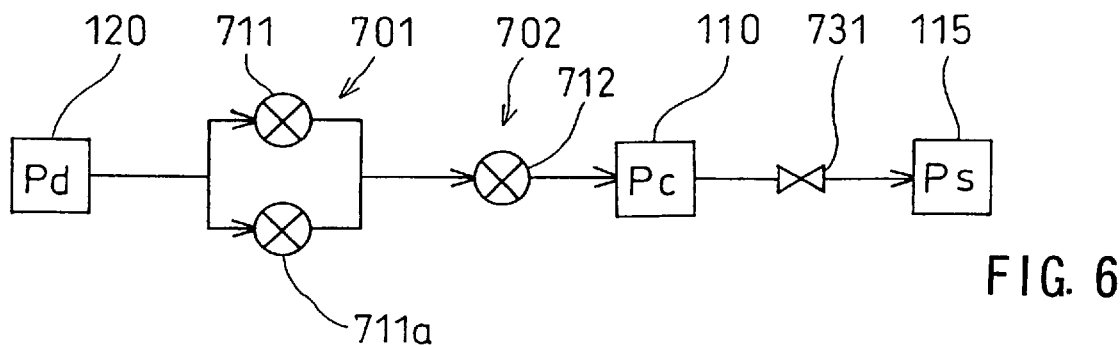

In FIG. 6, a cooling circuit capacity controller 701 may include a cooling circuit capacity control valve 711 and a pilot valve 711a. The cooling circuit capacity control valve 711 is opened based on a difference between the suction pressure Ps and another pressure. The pilot valve 711a is disposed in parallel with the cooling circuit capacity control valve 711 such that the pilot valve 711a connects an upstream side of the cooling circuit capacity control valve 711 to a downstream side of the cooling circuit capacity control valve 711. The pilot valve 711a is opened or closed by utilizing a solenoid that is not shown in the drawings. A heating circuit capacity controller 702 is provided in series with the cooling circuit capacity controller 701 and may include a heating circuit capacity control valve 712 that is opened based on an outside signal.

During the operation of the cooling circuit, the pilot valve 711a is closed for introducing the refrigerant from the discharge chamber 120 to the cooling circuit capacity control valve 711. The heating circuit capacity control valve 712 is opened for communicating the cooling circuit capacity control valve 711 to the driving chamber 110. When the compressor suction pressure Ps results predetermined low-pressure state, the predetermined low suction pressure increases the pressure difference and opens the cooling circuit capacity control valve 711. By opening the cooling circuit capacity control valve 711, high-pressure refrigerant within the discharge chamber 120 is released into the driving chamber 110 through the cooling circuit capacity control valve 711 and through the heating circuit capacity control valve 712, thereby decreasing the compressor output discharge capacity, increasing the suction pressure and preventing the heat exchanger in the cooling circuit from being frosted.

During the operation of the heating circuit, the pilot valve 711a is opened without respect to the opening or closing of the cooling circuit capacity control valve 711 for introducing the refrigerant from the discharge chamber 120 to the heating circuit capacity control valve 712. Otherwise, the pilot valve 711a is opened at least when the discharge pressure results predetermined high-pressure state during the operation of the heating circuit.

When the discharge pressure Pd results abnormally high-pressure state during operation of the heating circuit, the heating circuit capacity control valve 712 is opened based on the value of the discharge pressure and high-pressure refrigerant within the discharge chamber 120 is released into the driving chamber 110 through the pilot valve 711a and the heating circuit capacity control valve 712, thereby decreasing the compressor output discharge capacity and alleviating the abnormally high discharge pressure.

In operating both the heating and the cooling circuits, the refrigerant released into the driving chamber 110 is retained within the driving chamber 110 relatively for long time because the throttle 731 prevents the refrigerant from being released swiftly from the driving chamber 110 into the suction chamber 115. Therefore, the high-pressure state within the driving chamber 110 can be maintained relatively for long time, thereby effectively decreasing the compressor output discharge capacity.

Figure 7:
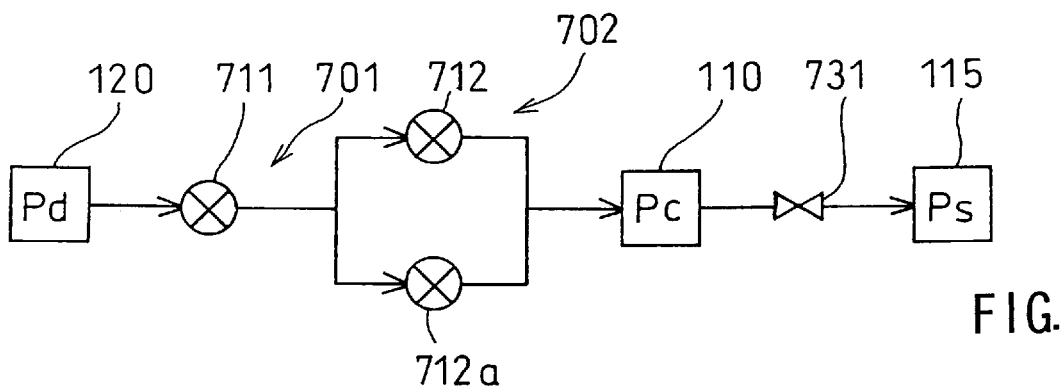

In FIG. 7, a cooling circuit capacity controller 701 may include a cooling circuit capacity control valve 711 that is opened based on an outside signal. A heating circuit capacity controller 702 is provided in series with the cooling circuit capacity controller 701 and may include a heating circuit capacity control valve 712 and a pilot valve 712a. The heating circuit capacity control valve 712 is opened based on a difference between the discharge pressure Pd and another pressure. The pilot valve 712a is disposed in parallel with the heating circuit capacity control valve 712 such that the pilot valve 712a connects an upstream side of the heating circuit capacity control valve 712 and a downstream of the heating circuit capacity control valve 712. The pilot valve 712a is opened or closed by utilizing a solenoid that is not shown in the drawings.

During the operation of the heating circuit, the pilot valve 712a is closed without respect to opening or closing of the heating circuit capacity control valve 712 for introducing the refrigerant to the heating circuit capacity control valve 712 and the cooling circuit capacity control valve 711 is opened for introducing the refrigerant from the discharge chamber 120 to the heating circuit capacity control valve 712. Otherwise, the cooling circuit capacity control valve 711 may be opened at least when the discharge pressure results predetermined high-pressure state during the operation of the heating circuit. When the discharge pressure results predetermined high-pressure state during operation of the heating circuit, the abnormally high discharge pressure increases the pressure difference and opens the heating circuit capacity control valve 712. By opening the heating circuit capacity control valve 712, high-pressure refrigerant within the discharge chamber 120 is released into the driving chamber 110 through the cooling circuit capacity control valve 711 that is opened during the operation of the heating circuit and through the heating circuit capacity control valve 712, thereby alleviating the abnormally high discharge pressure in operating the heating circuit.

During the operation of the cooling circuit, the pilot valve 712a is opened without respect to opening or closing of the heating circuit capacity control valve 712 for communicating the cooling circuit capacity control valve 711 with the driving chamber 110. Otherwise, the pilot valve 712a may be opened at least when the suction pressure Ps results predetermined low-pressure state during the operation of the cooling circuit. When the suction pressure Ps results predetermined low-pressure state during operation of the cooling circuit, the cooling circuit capacity control valve 711 is opened and high-pressure refrigerant within the discharge chamber 120 is released into the driving chamber 110 through the cooling circuit capacity control valve 711 and through the pilot valve 712a, thereby preventing the heat exchanger in the cooling circuit from being frosted.

In operating both the heating and the cooling circuits, the refrigerant released into the driving chamber 110 is retained within the driving chamber 110 relatively for long time because the throttle 731 prevents the refrigerant from being released swiftly from the driving chamber 110 into the suction chamber 115. Therefore, the high-pressure state within the driving chamber 110 can be maintained relatively for long time, thereby effectively decreasing the compressor output discharge capacity.

Figure 8:
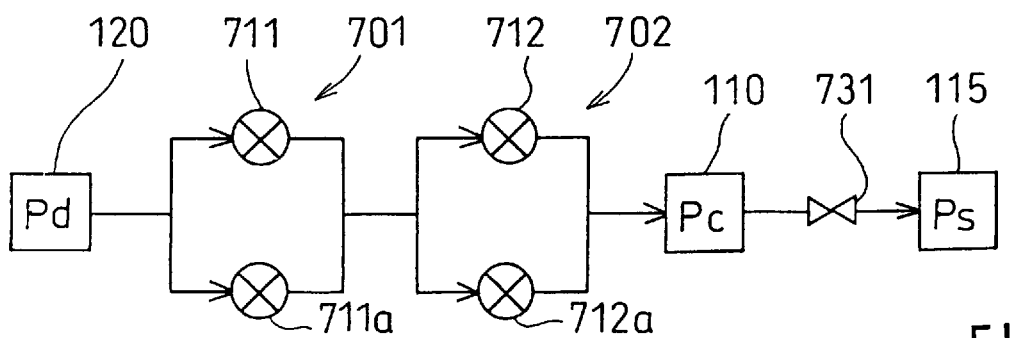

In FIG. 8, a cooling circuit capacity controller 701 may include a cooling circuit capacity control valve 711 and a pilot valve 711a. The cooling circuit capacity control valve 711 is opened based on a difference between the compressor suction pressure Ps and another pressure. The pilot valve 711a is disposed in parallel with the cooling circuit capacity control valve 711 such that the pilot valve 711a connects an upstream side of the cooling circuit capacity control valve 711 with a downstream side of the cooling circuit capacity control valve 711. The pilot valve 711a is opened or closed by utilizing a solenoid that is not shown in the drawings. A heating circuit capacity controller 702 is provided in series with the cooling circuit capacity controller 701 and may include a heating circuit capacity control valve 712 and a pilot valve 712a. The heating circuit capacity control valve 712 is opened based on a difference between the compressor discharge pressure Pd and another pressure. The pilot valve 712a is disposed in parallel with the heating circuit capacity control valve 712 such that the pilot valve 712 connects an upstream side of the heating circuit capacity control valve 712 with a downstream side of the heating circuit capacity control valve 712. The pilot valve 712a is opened or closed by utilizing a solenoid that is not shown in the drawings.

During the operation of the cooling circuit, the pilot valve 711a is closed for introducing the refrigerant from the discharge chamber 120 to the cooling circuit capacity control valve 711. And the pilot valve 712a is opened for communicating the cooling circuit capacity control valve 711 with the driving chamber 110. Otherwise, the pilot 712a valve may be opened at least when the suction pressure results predetermined low-pressure state during operation of the cooling circuit. When the suction pressure Ps results predetermined low-pressure state during operation of the cooling circuit, the cooling circuit capacity control valve 711 is opened. By opening the cooling circuit capacity control valve 711, the refrigerant within the discharge chamber 120 is released into the driving chamber 110 through the cooling circuit capacity control valve 711 and the pilot valve 712a, thereby increasing the suction pressure and preventing the heat exchanger in the cooling circuit from being frosted.

During the operation of the heating circuit, the pilot valve 711a is opened for communicating the discharge chamber 120 with the heating circuit capacity control valve 712. Otherwise, the pilot valve 711a may be opened at least when the discharge pressure results predetermined high-pressure state during operation of the heating circuit. And the pilot valve 712a is closed for introducing the refrigerant to the heating circuit capacity control valve 712. When the discharge pressure Pd results predetermined high-pressure state during operation of the heating circuit, the abnormally high discharge pressure increases the pressure difference and the heating circuit capacity control valve 712 is opened. By opening of the heating circuit capacity control valve 712, the refrigerant within the discharge chamber 120 is released into the driving chamber 110 through the pilot valve 711a and through the heating circuit capacity control valve 712, thereby alleviating the abnormally high discharge pressure in operating the heating circuit.

In alleviating the abnormally high discharge pressure during the operation of the heating circuit by utilizing a capacity control valve that is opened by an outside signal in each representative embodiment, the capacity control valve may preferably be opened based on a value related to change in the discharge pressure. Preferably, one-time (discharge pressure increasing speed) or multiple-times differential value such as two-times differential value (discharge pressure increasing acceleration) can be utilized. It is determined that the discharge pressure will not increase drastically when, for example, the discharge pressure increasing speed (one-time differential value of the discharge pressure) does not exceed the predetermined value. And it is determined that the discharge pressure will increase drastically when the discharge pressure increasing speed exceeds the predetermined value. Therefore, it is possible to control the opening of the capacity control valve in response to the discharge pressure increasing speed.

In above-described embodiments, the heating circuit capacity controller is disposed downstream of the cooling circuit capacity controller. To the contrary, the heating circuit capacity controller may be disposed upstream of the cooling circuit capacity controller onto the capacity control passage extending from the discharge chamber to the driving chamber.

Further, in above-described embodiments, the cooling circuit capacity control valve and the heating circuit capacity control valve are disposed within the housing of the compressor. However, these devices can be provided outside the compressor in part or in whole. Further, a one-sided swash plate type of compressor, i.e., a compressor having pistons 135 disposed on only one side of the swash plate 130 in FIG. 3, is utilized as the variable displacement compressor in above-described representative embodiments. However, a double-ended piston type can also be utilized in the variable displacement compressor, in which pistons are connected to opposite sides of the swash plate for reciprocation.

Further, although it is not particularly shown in the drawings, following features may be preferably employed to any of the representative embodiments.

First, driving chamber decompression means that releases the refrigerant from the driving chamber 110 in FIG. 3 into the suction area (such chamber 115, suction port 118a or suction opening 116) separately from the bleeding passage 501 when the driving chamber 110 is brought into a predetermined high-pressure state. The driving chamber decompression means may preferably have a passage extending from the driving chamber 110 to the suction area and a driving chamber decompression valve provided on the passage. The driving chamber decompression valve is opened when the driving chamber is brought into the predetermined high-pressure state in order to release the high-pressure refrigerant from the driving chamber 110 to the suction area to thereby prevent the airtight seal of the driving chamber 110 from being degraded.

Second, means for releasing the refrigerant directly from the discharge area (discharge chamber 120 or discharge opening 121) into the suction area may preferably be provided. The refrigerant releasing means may preferably have a passage extending from the discharge area to the suction area and a refrigerant releasing valve provided on the passage. The refrigerant releasing valve is opened when the discharge pressure is extremely increased such that the normal control by decreasing the compressor discharge capacity can not alleviate the extreme increase in the discharge pressure. Therefore, such means can be utilized as an emergent releasing means for decreasing the abnormally high-pressure state of the refrigerant.

What is claimed is:

1. An air conditioning system comprising:
    a compressor having a suction port, a discharge port, a driving unit provided within the compressor driving chamber, the driving unit decreasing compressor output discharge capacity when pressure within the driving chamber increases,
    a cooling circuit having a condenser and a heat exchanger provided on a passage extending from the discharge port to the suction port,
    a heating circuit having a passage extending from the discharge port to the heat exchanger,
    first and second capacity controllers provided in series onto the capacity control passage between the discharge port and the driving chamber,
    wherein the first capacity controller opens the capacity control passage when compressor suction pressure results predetermined low-pressure state during operation of the cooling circuit and the second capacity controller opens the capacity control passage during operation of the cooling circuit and
    wherein the first capacity controller opens the capacity control passage during operation of the heating circuit and the second capacity controller opens the capacity control passage when compressor discharge pressure results predetermined high-pressure state during operation of the heating circuit.

2. An air conditioning system according to claim 1 wherein the first capacity controller is disposed downstream of the discharge port on the capacity control passage and the second capacity controller is disposed downstream of the first capacity controller on the capacity control passage.

3. An air conditioning system according to claim 1, wherein the driving unit further comprises:
    a swash plate connected to a driving shaft disposed within the driving chamber, the swash plate rotating together with the driving shaft at an inclination angle with respect to a plane perpendicular to the driving shaft and
    a piston disposed in a cylinder bore, an end portion of the piston connected to a peripheral edge of the swash plate by means of a shoe, the piston reciprocating in the cylinder bore to compress the refrigerant in response to rotation of the swash plate in the driving chamber.

4. An air conditioning system according to claim 1, wherein the first capacity controller has a first capacity control valve disposed onto the capacity control passage and the second capacity controller has a second capacity control valve disposed in series with the first capacity control valve onto the capacity control passage,
    wherein the first capacity control valve opens the capacity control passage when compressor suction pressure results predetermined low-pressure state during operation of the cooling circuit and the second capacity control valve opens the capacity control passage during operation of the cooling circuit and wherein the first capacity control valve opens the capacity control passage during operation of the heating circuit and the second capacity control valve opens the capacity control passage when compressor discharge pressure results predetermined high-pressure state during operation of the heating circuit.

5. An air conditioning system according to claim 4, wherein the first capacity control valve and/or the second capacity control valve are/is provided within the compressor housing.

6. An air conditioning system according to claim 4, wherein the first capacity control valve opens the capacity control passage when the suction pressure is equal to or less than the reference pressure for opening the first capacity control valve and the second capacity control valve opens the capacity control passage when the discharge pressure is equal to or more than the reference pressure for opening the second capacity control valve.

7. An air conditioning system according to claim 6, wherein reference pressure for opening the first capacity control valve and/or reference pressure for opening the second capacity control valve are/is changeable.

8. An air conditioning system according to claim 7, wherein reference pressure may be changed by utilizing a solenoid.

9. An air conditioning system according to claim 1, wherein the capacity controller includes a capacity control valve and a pilot valve, the capacity control valve opening the capacity control passage based on a difference between the discharge pressure and another pressure or based on a difference between the suction pressure and another pressure, the pilot valve disposed in parallel with the capacity control valve.

10. An air conditioning system according to claim 9, wherein the pilot valve is opened to communicate the upstream of the capacity control valve with the downstream of the capacity control valve when another capacity controller controls the compressor output discharge capacity.

11. An air conditioning system according to claim 9, wherein the pilot valve is opened by utilizing a solenoid.

12. An vehicle comprising an air conditioning system according to claim 1 and an engine for driving the compressor.

13. A method of using the air conditioning system according to claim 1 comprising the step of:

communicating the discharge port with the driving chamber by utilizing first and second capacity controllers provided in series onto a capacity control passage between the discharge port with the driving chamber, the first capacity controller opening the capacity control passage during operation of the heating circuit and when compressor suction pressure results predetermined low-pressure state during operation of the cooling circuit, the second capacity controller opening the capacity control passage during operation of the cooling circuit and when compressor discharge pressure results predetermined high-pressure state during operation of the heating circuit.

14. A method according to claim 13, wherein the first capacity controller has a first capacity control valve disposed within the capacity control passage and the second capacity controller has a second capacity control valve disposed within the capacity control passage in series with the first capacity control valve, the first capacity control valve opening the capacity control passage during operation of the heating circuit and when compressor suction pressure results predetermined low-pressure state during operation of the cooling circuit, the second capacity control valve opening the capacity control passage during operation of the cooling circuit and when compressor discharge pressure results predetermined high-pressure state during operation of the heating circuit.

15. A method according to claim 13, wherein the capacity controller includes a capacity control valve and a pilot valve, the capacity control valve opening the capacity control passage based on a difference between the discharge pressure and another pressure or based on a difference between the suction pressure and another pressure, the pilot valve disposed in parallel with the capacity control valve.

16. A method according to claim 15, wherein the pilot valve is opened to communicate the upstream of the capacity control valve with the downstream of the capacity control valve when the another capacity controller controls the compressor output discharge capacity.

17. An air conditioning system comprising:

a compressor having a suction port, a discharge port, a driving unit provided within the compressor driving chamber, the driving unit decreasing compressor output discharge capacity when pressure within the driving chamber increases, a cooling circuit having a condenser and a heat exchanger provided on a passage extending from the discharge port to the suction port, a heating circuit having a passage extending from the discharge port to the heat exchanger, first and second means for controlling the compressor output discharge capacity, first and second means provided in series onto the capacity control passage between the discharge port and the driving chamber, wherein first means opens the capacity control passage when compressor suction pressure results predetermined low-pressure state during operation of the cooling circuit and second means opens the capacity control passage during operation of the cooling circuit and wherein first means opens the capacity control passage during operation of the heating circuit and second means opens the capacity control passage when compressor discharge pressure results predetermined high-pressure state during operation of the heating circuit.

18. An air conditioning system comprising:

a compressor having a suction port, a discharge port, a driving unit provided within the compressor driving chamber, the driving unit decreasing compressor output discharge capacity when pressure within the driving chamber increases, a heating circuit having a passage extending from the discharge port to the suction port through the heat exchanger, first and second capacity controllers provided in series onto the capacity control passage between the discharge port and the driving chamber, wherein the first capacity controller opens the capacity control passage during operation of the heating circuit and the second capacity controller opens the capacity control passage when compressor discharge pressure results predetermined high-pressure state during operation of the heating circuit.

* * * * *